(12) United States Patent
Terasawa et al.

(10) Patent No.: US 8,433,340 B2
(45) Date of Patent: Apr. 30, 2013

(54) METHOD AND APPARATUS IN A CDMA COMMUNICATION SYSTEM

(75) Inventors: Daisuke Terasawa, San Diego, CA (US); Francesco Grilli, La Jolla, CA (US); Serge Willenegger, Onnens (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/523,327

(22) Filed: Jun. 14, 2012

(65) Prior Publication Data

US 2012/0250568 A1 Oct. 4, 2012

Related U.S. Application Data

(60) Continuation of application No. 11/545,947, filed on Oct. 10, 2006, which is a division of application No. 09/576,063, filed on May 22, 2000, now Pat. No. 7,254,118.

(51) Int. Cl.
*H04W 24/00* (2009.01)

(52) U.S. Cl.
USPC .......... 455/456.1; 455/69; 455/436; 370/335; 370/350; 370/503; 375/146

(58) Field of Classification Search ............. 455/456.1, 455/442, 436, 69, 509; 370/206, 208, 335–337; 375/146–147
See application file for complete search history.

(56) References Cited

U.S. PATENT DOCUMENTS

| | | | |
|---|---|---|---|
| 5,101,501 A | 3/1992 | Gilhousen et al. | |
| 5,201,066 A | 4/1993 | Kim | |
| 5,471,501 A | 11/1995 | Parr et al. | |
| 5,640,414 A | 6/1997 | Blakeney, II et al. | |
| 5,640,679 A | 6/1997 | Lundqvist et al. | |
| 5,764,188 A | 6/1998 | Ghosh et al. | |
| 5,828,659 A * | 10/1998 | Teder et al. | 370/328 |
| 5,893,036 A | 4/1999 | Trandai et al. | |
| 6,005,852 A | 12/1999 | Kokko et al. | |

(Continued)

FOREIGN PATENT DOCUMENTS

| | | |
|---|---|---|
| EP | 0845877 | 6/1998 |
| JP | 6334593 A | 12/1994 |

(Continued)

OTHER PUBLICATIONS

3G TS 25.331, v. 3.2.0 (Mar. 2000), 8.3.4, 8.5.7, 8.5.7.6.13, 10.3.7.3, 10.3.7.5, 10.3.7.6, 10.3.6.15, 10.3.6.17, 10.3.7.90.

(Continued)

*Primary Examiner* — George Eng
*Assistant Examiner* — Inder Mehra
(74) *Attorney, Agent, or Firm* — Nicholas A. Cole

(57) ABSTRACT

A novel and improved method and apparatus, in a WCDMA communication system, for informing a mobile station of a downlink data frame time offset by determining the downlink data frame time offset, and transmitting the downlink data frame time offset via an Active Set Update message transmitted from a cell to mobile station. Once an Active Set Update message is received, the data frame time offset information is provided to a timing block which may determine data frame boundary of each downlink signal. Timing block may then adjust the PN sequence timing corresponding to the downlink signal associated with the data frame time offset such that corresponding data symbols in each data frame are correctly soft combined in a combiner.

20 Claims, 2 Drawing Sheets

U.S. PATENT DOCUMENTS

| | | | |
|---|---|---|---|
| 6,011,974 | A | 1/2000 | Cedervall et al. |
| 6,018,667 | A | 1/2000 | Ghosh et al. |
| 6,061,337 | A | 5/2000 | Light et al. |
| 6,239,719 | B1 | 5/2001 | Hopkins |
| 6,259,683 | B1 | 7/2001 | Sekine et al. |
| 6,363,060 | B1 | 3/2002 | Sarkar |
| 6,477,183 | B1 | 11/2002 | Yamamoto |
| 6,546,252 | B1 | 4/2003 | Jetzek et al. |
| 7,254,118 | B1 | 8/2007 | Terasawa et al. |
| 7,492,754 | B2 | 2/2009 | Terasawa et al. |
| 8,244,256 | B2 | 8/2012 | Terasawa et al. |
| 2001/0046240 | A1 | 11/2001 | Longoni et al. |
| 2002/0196754 | A1 | 12/2002 | Lugil et al. |

FOREIGN PATENT DOCUMENTS

| | | | |
|---|---|---|---|
| JP | 8500474 | T | 1/1996 |
| JP | 10164650 | A | 6/1998 |
| JP | 10174158 | A | 6/1998 |
| JP | 2002524967 | A | 8/2002 |
| WO | 9430024 | A1 | 12/1994 |
| WO | 9844669 | | 10/1998 |
| WO | 9857450 | | 12/1998 |

OTHER PUBLICATIONS

3G TS 25.331, vol. 3.2.0 (Mar. 2000), Section 7.

3GPP, "Universal Mobile Telecommunications System (UMTS),"RRC Protocol Specification (3G TS 25.331, Ver. 3.2.0, Rel. 1999), ETIS Standards, European Telecommunications Standards Institute, Sophia-Antipo, FR, vol. 3-R2, No. 3.2.0, Mar. 2000, pp. 1-507, XP014008794, ISSN: 0000-0001, paras. 8.3.4-8.3.4.3.

European Search Report EP06022087, European Search Authority, Munich, Nov. 17, 2006.

European Search Report, EP06022087.8-2411, Nov. 28, 2006, pp. 1-3.

International Search Report PCT/US2001/016225, International Search Authority, European Patent Office, Sep. 10, 2001.

International Preliminary Examination Report, PCT/US2001/016225, IPEA/US, Jan. 16, 2003.

"Universal Mobile Telecommunications 1-16 System (UMTS)," ETSI Standards, European Telecommunications Standards Institute Sophia-Antipo, FR, vol. 3-R2, No. V320, Mar. 2000, pp. 1-360, XP014008794, ISSN: 0000-001, paras. 8.3.4-8.3.4.3.

ETSI TS 125 331 V3.2.0.3GPP, "Universal Mobile Telecommunications System (UMTS)," RRC Protocol Specification, Sophia-Antipo, FR, Mar. 2000, pp. 1-507, XP 014008794.

"Universal Mobile Telecommunications System (UMTS); Radio Resource Management Strategies," (3G TR 25.922, Ver. 3.1.0, Rel. 1999), Mar. 1, 2000, 992, V3.1.0, XX, XX, pps XP0021518978, para. 5.1.4.3.

European Search Report—EP08007122—Search Authority—Munich—Jul. 20, 2009.

* cited by examiner

METHOD AND APPARATUS IN A CDMA COMMUNICATION SYSTEM

CLAIM OF PRIORITY UNDER 35 U.S.C. §120

This application is a Continuation of pending U.S. patent application Ser. No. 11/545,947, entitled "Method And Apparatus In A CDMA Communication System" filed Oct. 10, 2006, which is a divisional of U.S. patent application Ser. No. 09/576,063 entitled "Method And Apparatus In A CDMA Communication System" filed May 22, 2000, which issued as U.S. Pat. No. 7,254,118, issued Aug. 7, 2007, both of which are hereby expressly incorporated by reference herein.

BACKGROUND OF THE INVENTION

I. Field of the Invention

The present invention relates to communication systems. More particularly, the present invention relates to a novel and improved method and apparatus for soft handoff operations in a communication system operating according to Wideband Code Division Multiple Access (WCDMA) principles.

II. Description of the Related Art

The 3rd Generation Partnership Project (3GPP) recently issued a version of its technical specifications commonly referred to as the WCDMA standard. The publication is well known in the art, and describes the operational standard in a WCDMA system. The standard is still evolving at the time of this application for a patent. A copy of the standard may be obtained by contacting 3GPP, 650 Route des Lucoles-Sophia Antipolis, Valbonne-France, or by accessing the World Wide Web at the internet address www.3gpp.org. The latest version of the standard at the time of this application for a patent, and all previously revised publications of the same, are incorporated by reference herein.

Soft handoff operation is well known. A patent issued to Blakeney, II et al, with U.S. Pat. No. 5,640,414, and a patent issued to Gilhousen et al, with U.S. Pat. No. 5,101,501, both assigned to the assignee of the present application for a patent, both incorporated by reference herein, provide methods and systems for providing soft handoff in communications in a CDMA communication system. Generally, a mobile station in soft handoff operation receives and combines multiple signals transmitted from different cells in order to improve the overall decoding and demodulation of the information. The signals transmitted from the cells involved in the soft handoff operation carry the same information. The mobile station after decoding and demodulating the signals combines the data metrics in a soft summing operation to add the data energy. As a result, the information data is received with less error.

In CDMA systems, including WCDMA systems, each cell may have a unique pseudo random noise (PN) sequence. Downlink signals transmitted from each cell are multiplied with the PN sequence as a part of the signal spreading function. The downlink signal received by a mobile station is subjected to a de-spreading operation in accordance with the PN sequence used by the transmitter. The result of the de-spreading operations at the data symbol level is combined with the result of de-spreading operation of other signals transmitted by other cells involved in the soft handoff operation. Signals originating from the same cell but arriving at the mobile with different delays due to multipath can be combined in the same manner. A commonly known Rake receiver may be used for the combining operation.

When performing the soft-combining operation, it is important that the mobile combines the matching symbols received from the cells involved in soft handoff. For example, the first symbol of a particular frame from a first cell needs to be combined with the first symbol of the matching frame from a second cell, and so on. The mobile station needs to know the frame timing of the data signals from each cell. Due to factors including the possibility of cell timing being asynchronous with each other, the possible timing offset between the PN spreading code frame timing and the data frame timing, and the uncertainties in the propagation delay, the mobile cannot necessarily rely on the arrival timing of the symbols from each cell to determine which symbols should be combined.

Therefore, there is a need for a method and apparatus for ensuring that a mobile station is aware of the data frame time offset of each downlink signal transmitted by each cell involved in a soft handoff operation at the mobile station.

SUMMARY OF THE INVENTION

The present invention is directed to a novel and improved method and apparatus, in a communication system, for informing a mobile station of a downlink data frame time offset by determining the downlink data frame time offset, and transmitting the downlink data frame time offset from a cell to the mobile station. The method and the accompanying apparatus further advantageously include receiving time offset information measured by the mobile station. Determining the downlink data frame time offset is based on the time offset measured by the mobile station. The mobile can determine the timing of the frame boundaries based on the offset information in the message. The timing offset measurement report sent by the mobile and received by the network is used by a new cell to come up with the frame offset. Once it comes up with the offset, it signals the chosen offset to the mobile. The method and the accompanying apparatus further advantageously include receiving the time offset via a measurement report message. The time offset is measured by the mobile station. The measurement report message is transmitted by the mobile station to at least a base station controller controlling the cell. Once the mobile station receives an Active Set Update message, the data frame time offset information is provided to a timing block. Upon knowing data frame time offsets associated with each downlink signal, the timing block may determine data frame boundaries of each downlink signal. The timing block may then adjust the PN sequence timing corresponding to the downlink signal associated with the data frame time offset such that corresponding data symbols in each data frame are correctly soft combined in a combiner. The result of the soft combining operation is subjected advantageously to a demodulator/decoder for retrieving the information.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus has been described in a patent application titled: "Method and Apparatus for Fast WCDMA Acquisition", with Ser. No. 09/345,283, commonly assigned to the assignee of the present application, and incorporated by reference herein. The Ser. No. 09/345,283 application provides a description for a method and apparatus for synchronization of a mobile station with a cell. Based on the synchronization data, the mobile station is able to determine a data frame time offset referenced to the mobile station uplink data frame timing. The uplink signal according to the standard is transmitted within a fixed time offset after reception of a downlink signal from a cell. The uplink signal time offset may be fixed to 1024 chips. The mobile station, after determining the observed time difference, transmits the information to the cell via a message commonly known as an SFN-SFN message. The 3G TS 25.331 v3.2.0 (2000-03) document, section 10.3.7.90, provides the description and the requirements for the observed time difference message. The observed time difference information is included in a cell measurement results message 10.3.7.3. The mobile station may periodically report to the cell. The mobile station measures and reports the time difference in a unit of a chip time.

The cell in connection with its base station controller sets data frame time offset for a downlink physical channel intended for the mobile station that reported the SFN number on a measurement report message. The 3G TS 25.221 v3.2.0 (2000-03) document, section 7 and its subsections, provides the description for the timing difference between different physical channels. For example, the primary common control physical channel is used as a timing difference for all physical channels, directly for the downlink and indirectly for the uplink. The dedicated physical channels intended for communication of data and voice information are set in a data frame time offset from common control and pilot physical channels. The data frame time offset is set in a multiple of 256 chips from the common control and pilot physical channels.

The mobile station transmits a report message based on the measurement of the signals, such as the sync and the common pilot signals, for each cell within a range. Each report message contains the time delay difference measurement between the uplink timing and the downlink PN sequence frame timing from each cell (i.e. common and pilot channel frame timing) and an SFN number. The propagation distance from each base station to the mobile station may be different. The observed time difference measured by the mobile station for each cell may be different. The downlink data frame time offset is set by each cell based on its corresponding measurement report. Each cell may be operating on its own timing synchronously or asynchronously.

Figure 1:
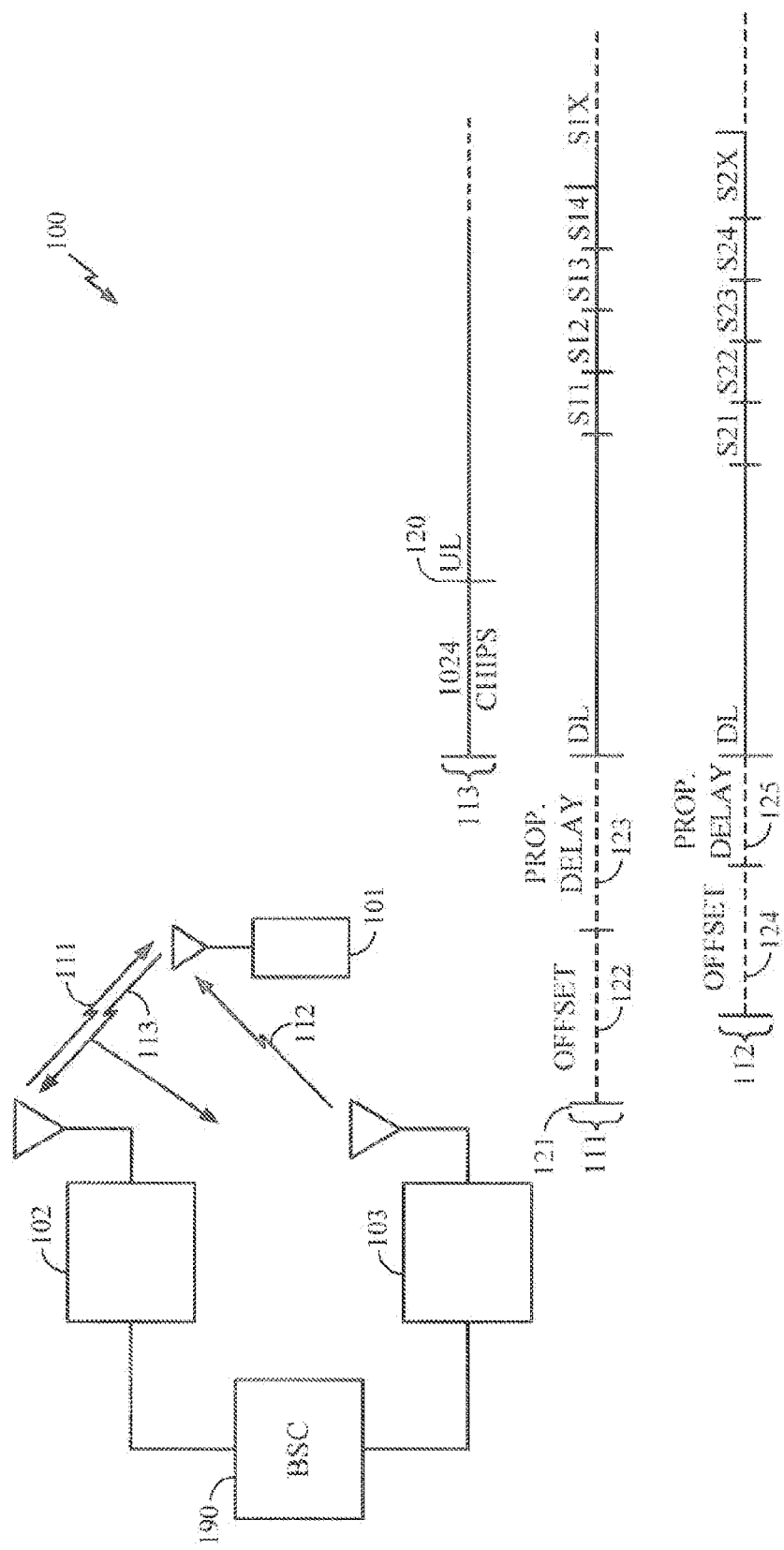
FIG. 1 is a block diagram of downlink signal timing with respect to each other and an uplink signal communicated between a mobile station and two cells in a soft handoff condition in a communication system.

Referring to FIG. 1, in an exemplary situation, a mobile station 101 in a soft handoff situation with cells 102 and 103 receives two downlink signals 111 and 112. A mobile station may be in soft handoff with more than two cells; however, for simplicity of explanation, only a two-way handoff situation is described. Mobile station 101 transmits uplink signal 113 to be received by cells 102 and 103. Each cell uses the time offset value reported in the measurement report message to set the data frame time offset such that the downlink signal received by the mobile station is approximately 1024 chips away in time from the uplink signal transmitted from the mobile station. For illustrative purposes, for example, uplink signal 113 is transmitted at time 120. Cell 102 communicates to mobile station 101 via downlink 111. If the common control channel time reference of cell 102 is at time 121, cell 102 sets a data frame time offset 122 from time 121 such that after taking into account the propagation delay 123, downlink signal 111 arrives approximately 1024 chips time away from uplink transmit time 120.

Mobile station 101 transmits a measurement report message to the network including a base station controller 190 which informs cell 103 the timing information necessary for determining a time frame offset 124 associated with downlink 112. Cell 103 sets data frame time offset 124 such that after including a propagation delay 125 associated with propagation delay of downlink signal 112, downlink signal 112 arrives at mobile station 101 approximately 1024 chips time away from uplink transmit time 120. The downlink signals 111 and 112, thus, arrive within approximately 1024 chips time of the uplink signal 113 at mobile station 101. When mobile station 101 is in soft handoff with base stations 102 and 103 via downlink signals 111 and 112, respectively, the soft combining operation may be performed.

In one embodiment of the invention, the data frame time offset 122 and 124 are in increments of 256 chips time. The beginning of the PN sequence is set to coincide at the beginning of the cell common control and pilot channel time frame. Each downlink physical channel is spread with a PN sequence. As such, each downlink signal is at least 256 chips in time offset from the other. Downlink signals to different mobiles can have the same timing offset.

In one embodiment of the invention, when the mobile station 101 is performing soft combining at the data symbol level, the data symbols extracted from each downlink signal may be identified in terms of location in the data frame for an effective soft combining operation with another data symbol in the same location of another data frame. Each data symbol may be between 4 and 512 chips in duration. The data frame time offset is in increments of 256 chips. Data symbols transmitted via the downlink signals then need to be identified at the mobile station for the soft combing operation. Data frame time offset 122 is set by cell 102 and data frame time offset 124 is set by cell 103, depending on the measurements reported by the mobile station. The data symbols S1X received via downlink signal 111 need to be combined with data symbols S2X received via downlink signal 111. if mobile station 101 is not aware of the data symbol boundaries, data symbols of different downlink signals may not correspondingly be combined. Since the cells attempt to adjust the transmit timing of the data channel so that signals from different cells arrive at the mobile station at roughly the same time, one thing the mobile may do is combine symbols that are "closest" together in time. However, the possibility of propagation time relationships changing between the time of measurement report and the start of the soft combining operation leaves ambiguities for the mobile station for soft combining operation.

According to various embodiments of the invention, in a communication system 100, a method and accompanying apparatus provide for informing mobile station 101 of a downlink data frame time offset by determining the downlink data frame time offset, and transmitting the downlink data frame time offset via an Active Set Update message transmitted from a cell to mobile station 101. The method and the accompanying apparatus further include receiving time offset information measured by mobile station 101. Determining the downlink data frame time offset is then based on the time offset measured by mobile station 101. The method and the accompanying apparatus further include receiving the time offset via a measurement report message. The time offset is measured by mobile station 101. The measurement report message is transmitted by mobile station 101 to at least base station controller 190.

In one embodiment of the invention, mobile station 101 may adjust its internal timing after identifying the boundaries of data symbols for the combining operation. An effective combining operation is possible since according to an embodiment of the invention, mobile station 101 is aware of the data frame time offset used by the cells. Mobile station 101 is able to determine data symbol boundaries since the downlink signal is spread by a PN sequence whose beginning coincides with the beginning of the common control channel and the pilot channel. Mobile station 101 while in communication with a cell knows the timing boundary of the common control channel and the pilot channel, as deduced from timing associated with the beginning of the PN sequence through an ongoing synchronization process. The mobile station 101 measures the PN sequence timing Knowing the relationship between the PN sequence timing and the control/pilot channel frame timing allows mobile station 101 to deduce the frame timing. Mobile station 101 de-spreads the downlink signal by removing the PN sequence from the signal. The boundary of the first data symbol is offset in time in increments of the data frame time offset from the beginning of the PN sequence. Therefore, once the mobile station knows the data frame time offset, it can determine the location of the data frame boundary with respect to the PN sequence timing. Since data symbols are fixed in duration, boundaries of subsequent data symbols after the first data symbol can easily be determined The data symbol combining operation takes place after the despreading operation. The mobile station can adjust the data symbol boundaries of a Rake receiver finger to coincide to the data symbol boundaries outputting from other fingers assigned to other downlink signals.

The 3G TS 25.331 v3.2.0 (2000-03) document, section 8.3.4, provides a procedure for generating Active Set Update message in a soft handover operation, otherwise known as a soft handoff operation. The purpose of the Active Set Update is to update the active set of the connections between the mobile station and various cells involved in the soft handoff operation. The base station controller (BSC) 190 initiates the procedure to modify the downlink connections. For all the signaling activities including—ACTIVE SET UPDATE, MEASUREMENT REPORT, etc, the mobile station is in communication with the BSC 190 (or radio network controller (RNC) in WCDMA terminology). Each cell includes a transceiver that does some physical layer processing (such as coding/decoding, interleaving/deinterleaving, and spreading/despreading.) The 3G TS 25.331 v3.2.0 (2000-03) document, section 8.5.7, provides the description for generic actions for receipt of the information. A new Section 8.5.7.6.13 may be added that may describe according to various embodiments of the invention what mobile station 101 is expected to do when it receives data frame time offset. Pursuant to the section 10.3.6.15, Downlink DPCH information for radio link may be modified to include the data frame time offset associated with the downlink. The data frame time offset may be communicated in increments of a chip time or 256 chip times.

Figure 2:
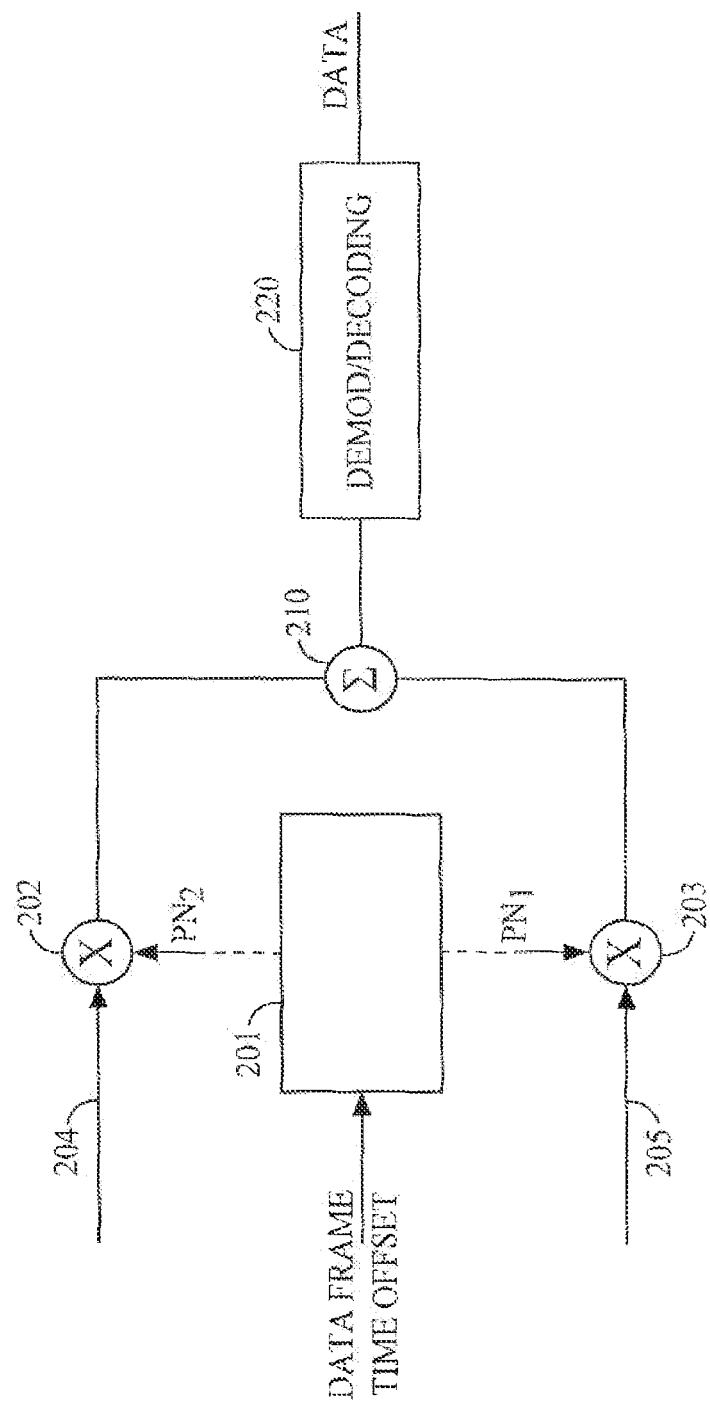
FIG. 2 is a block diagram of a portion of a receiver in a mobile station for determining time boundaries of data symbols based on data frame time offsets communicated to the mobile station via an Active Set Update message in accordance with various embodiments of the invention.

Referring to FIG. 2, a simplified block diagram of a receiver in a mobile station is shown for soft combining operation according to various embodiments of the invention. Downlink signals 204 and 205, after proper down conversion and signal processing (not shown), are input to de-spreaders 202 and 203. Each downlink signal may be associated with a cell. Once an Active Set Update message is received, the data frame time offset information is provided to a timing block 201. Upon knowing the data frame time offset associated with each downlink signal, timing block 201 may determine the data frame boundaries of each downlink signal. Timing block 201 may then adjust the PN sequence timing corresponding to the downlink signal associated with the data frame time offset such that corresponding data symbols in each data frame are correctly soft combined in a combiner 210. The result of the soft combined operation is provided to the demodulator/decoder 220 for retrieving the information.

Accordingly, a soft combining operation at the data symbol level is performed with high efficiency and accurate results.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for soft combining of wireless signals at a mobile station, comprising:
   receiving a first downlink signal from a first cell;
   receiving a second downlink signal from a second cell;
   measuring time offset values as time delay differences between uplink timing of the mobile station and downlink pseudo random noise (PN) sequence frame timing from the first cell and from the second cell;
   transmitting a report message comprising a system frame number (SFN) and the measured time offset values;
   receiving a first downlink data frame time offset from the first cell and a second downlink data frame time offset from the second cell via Active Set Update message;
   providing the first and second downlink data frame time offsets to a timing block; and
   adjusting timing of the first and second downlink signals based upon the respective first and second downlink data frame time offsets; and
   soft combining the first and second downlink signals in a soft combiner.

2. The method of claim 1, further comprising performing down conversion and signal processing on the first and second downlink signals prior to adjusting the timing.

3. The method of claim 2, further comprising:
   inputting the first downlink signal to a first de-spreader and inputting the second downlink signal to a second de-spreader;
   determining a first data frame boundary of the first downlink signal based upon the first downlink data frame time offset;
   determining a second data frame boundary of the second downlink signal based upon the second downlink data frame time offset; and
   adjusting PN sequence timing of the first and second downlink signals such that corresponding data symbols in each data frame are correctly soft combined in a combiner.

4. The method of claim 3, further comprising providing the result of the soft combining operation to a demodulator/decoder for retrieving information.

5. The method of claim 3, wherein determining each data frame boundary based upon the respective downlink data frame time offsets comprises:
   measuring a PN sequence timing;

determining a timing boundary of a common control channel and a pilot channel based upon a relationship between the PN sequence timing and the control/pilot channel frame timing; and determining a boundary of the first data symbol based on an offset in time in increments of the data frame time offset from the beginning of the PN sequence.

6. The method of claim 5, further comprising adjusting the mobile station internal timing after identifying the boundaries of data symbols for the combining operation.

7. The method of claim 6, further comprising adjusting data symbol boundaries of a Rake receiver finger to coincide to data symbol boundaries outputting from other fingers assigned to other downlink signals.

8. The method of claim 1, further comprising providing a result of the soft combining operation to a demodulator/decoder for retrieving information.

9. A mobile station, comprising:
a receiver;
a transmitter;
a timing block; and
a soft combiner,
wherein:
the receiver is configured to receive a first downlink signal from a first cell and receiving a second downlink signal from a second cell;
the transmitter is configured to transmit a report message comprising a system frame number (SFN) and measured time delay differences between uplink timing of the mobile station and downlink pseudo random noise (PN) sequence frame timing from the first cell and from the second cell;
the receiver is further configured to receive a first downlink data frame time offset from the first cell and a second downlink data frame time offset from the second cell via Active Set Update message and providing the first and second downlink data frame time offsets to the timing block;
the timing block is configured to adjust timing of the first and second downlink signals based upon the respective first and second downlink data frame time offsets; and
the soft combiner is configured to soft combine the first and second downlink signals.

10. The mobile station of claim 9, wherein the receiver is further configured to perform down conversion and signal processing on the first and second downlink signals prior to input to the timing block.

11. The mobile station of claim 10, further comprising a first de-spreader configured to receive the first downlink signal and a second de-spreader receiving the second downlink signal,
wherein the timing block is further configured for adjusting PN sequence timing of the first and second downlink signals such that corresponding data symbols in each data frame are correctly soft combined in the soft combiner.

12. The mobile station of claim 11, further comprising a demodulator/decoder configured to retrieve information from the output of the soft combiner.

13. The mobile station of claim 9, further comprising a demodulator/decoder configured to receive information from the output of the soft combiner.

14. A mobile station, comprising:
means for receiving a first downlink signal from a first cell and a second downlink signal from a second cell;
means for measuring time offset values as time delay differences between uplink timing of the mobile station and downlink pseudo random noise (PN) sequence frame timing from the first cell and from the second cell;
means for transmitting a report message comprising a system frame number (SFN) and the measured time offset values;
means for receiving a first downlink data frame time offset from the first cell and a second downlink data frame time offset from the second cell via Active Set Update message;
means for adjusting timing of the first and second downlink signals based upon the respective first and second downlink data frame time offsets; and
means for soft combining the first and second downlink signals.

15. The mobile station of claim 14, further comprising means for performing down conversion and signal processing on the first and second downlink signals prior to adjusting the timing.

16. The mobile station of claim 15, further comprising:
means for de-spreading the first downlink signal and the second downlink signal;
means for determining a first data frame boundary of the first downlink signal based upon the first downlink data frame time offset;
means for determining a second data frame boundary of the second downlink signal based upon the second downlink data frame time offset; and
means for adjusting PN sequence timing of the first and second downlink signals such that corresponding data symbols in each data frame are correctly soft combined in the means for soft combining.

17. The mobile station of claim 16, further comprising means for demodulating/decoding the result of soft combining in order to retrieve information.

18. The mobile station of claim 16, wherein means for determining each data frame boundary based upon the respective downlink data frame time offsets comprises:
means for measuring a PN sequence timing;
means for determining a timing boundary of a common control channel and a pilot channel based upon a relationship between the PN sequence timing and the control/pilot channel frame timing; and
means for determining a boundary of the first data symbol based on an offset in time in increments of the data frame time offset from the beginning of the PN sequence.

19. The mobile station of claim 18, further comprising means for adjusting the mobile station internal timing after identifying the boundaries of data symbols for the combining operation.

20. The mobile station of claim 14, further comprising means for demodulating/decoding the result of soft combining in order to retrieve information.

* * * * *